United States Patent

Yonezawa et al.

[11] Patent Number: 5,995,646
[45] Date of Patent: Nov. 30, 1999

[54] METHOD OF AND SYSTEM FOR WORK TRANSPORTATION CONTROL

[75] Inventors: Yasuaki Yonezawa; Hiroo Arataki, both of Hiroshima-ken, Japan

[73] Assignee: Mazda Motor Corporation, Hiroshima, Japan

[21] Appl. No.: 09/008,570

[22] Filed: Jan. 16, 1998

Related U.S. Application Data

[63] Continuation of application No. 08/360,933, Dec. 21, 1994, abandoned.

[30] Foreign Application Priority Data

Dec. 22, 1993 [JP] Japan .................................. 5-324525

[51] Int. Cl.⁶ ...................................................... G06K 9/00
[52] U.S. Cl. .............. 382/141; 364/478.05; 364/478.16; 209/939; 901/2
[58] Field of Search ..................................... 382/141, 143, 382/151, 152; 348/86, 91, 92; 901/26–8, 46; 364/468.01, 468.19–468.21, 478.01–478.06, 478.16–478.18; 209/576, 577, 587, 939

[56] References Cited

U.S. PATENT DOCUMENTS

| | | | |
|---|---|---|---|
| 4,305,130 | 12/1981 | Kelley et al. | 364/478 |
| 4,758,888 | 7/1988 | Lapidot | 348/91 |
| 5,293,322 | 3/1994 | Yagi et al. | 364/478 |
| 5,353,495 | 10/1994 | Terabayashi et al. | 901/7 |
| 5,373,451 | 12/1994 | Furukawa | 364/478 |
| 5,388,706 | 2/1995 | Baldur | 209/939 |
| 5,501,571 | 3/1996 | Van Durrett et al. | 364/478 |
| 5,526,437 | 6/1996 | West | 382/141 |

FOREIGN PATENT DOCUMENTS

| | | | |
|---|---|---|---|
| 61-55016 | 3/1986 | Japan . | |
| 2-180573 | 7/1990 | Japan . | |
| 3-95025 | 4/1991 | Japan . | |
| 5-26281 | 8/1991 | Japan . | |
| 5285800 | 11/1993 | Japan | B23Q 41/00 |

*Primary Examiner*—Leo H. Boudreau
*Assistant Examiner*—Bhavesh Mehta
*Attorney, Agent, or Firm*—Martin Fleit

[57] ABSTRACT

A work transportation line includes a work handling apparatus which has an operation that is automatically changed in response to alteration of a work type, from one type to another, so as to be suitable for a work type to which a subject work is altered. An indication of a work type alteration is provided as a result of a comparison between specified attributes of a subject work, which are extracted from a two-valued image of the subject work, and predetermined reference attributes for various work types.

16 Claims, 14 Drawing Sheets

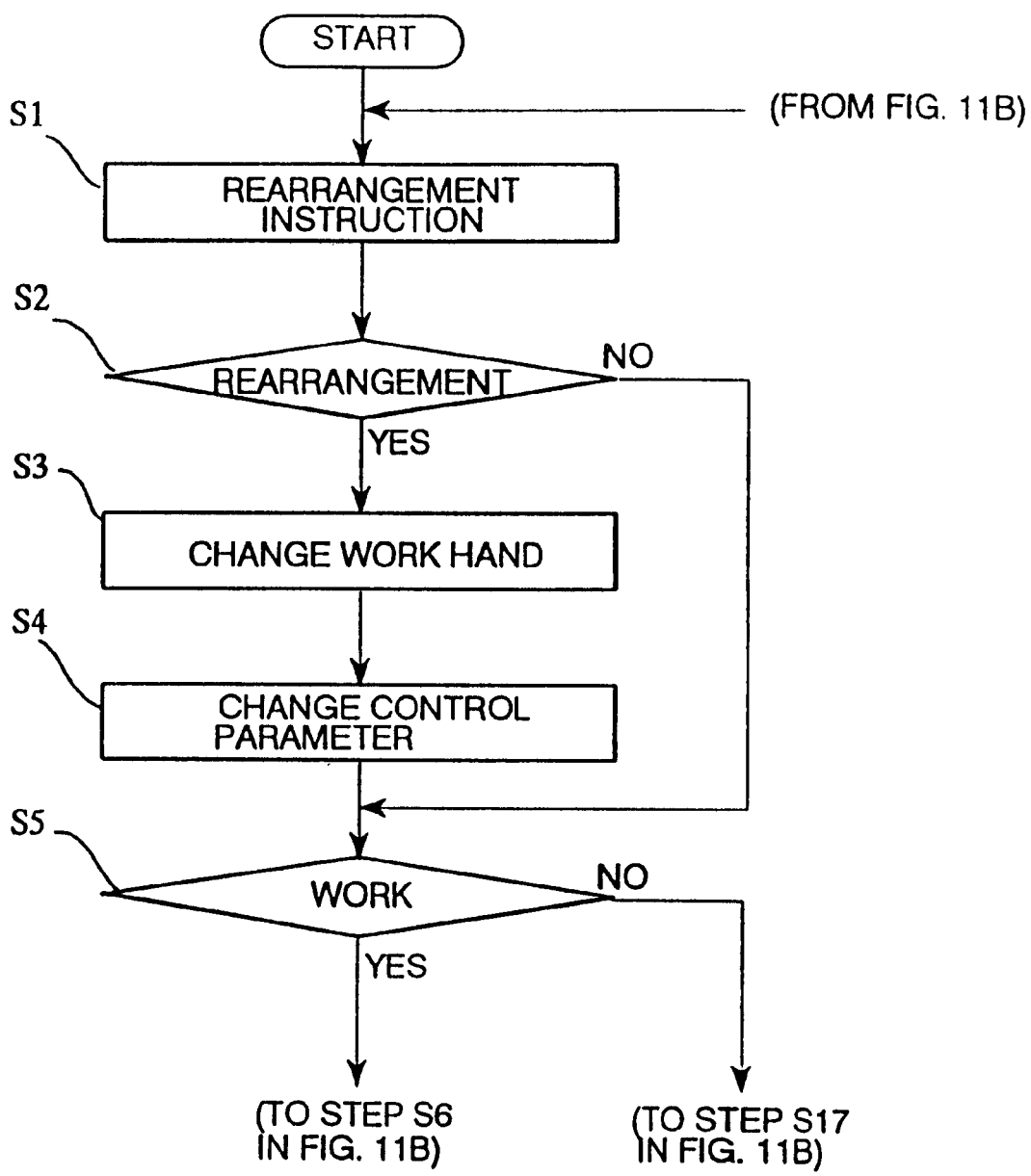

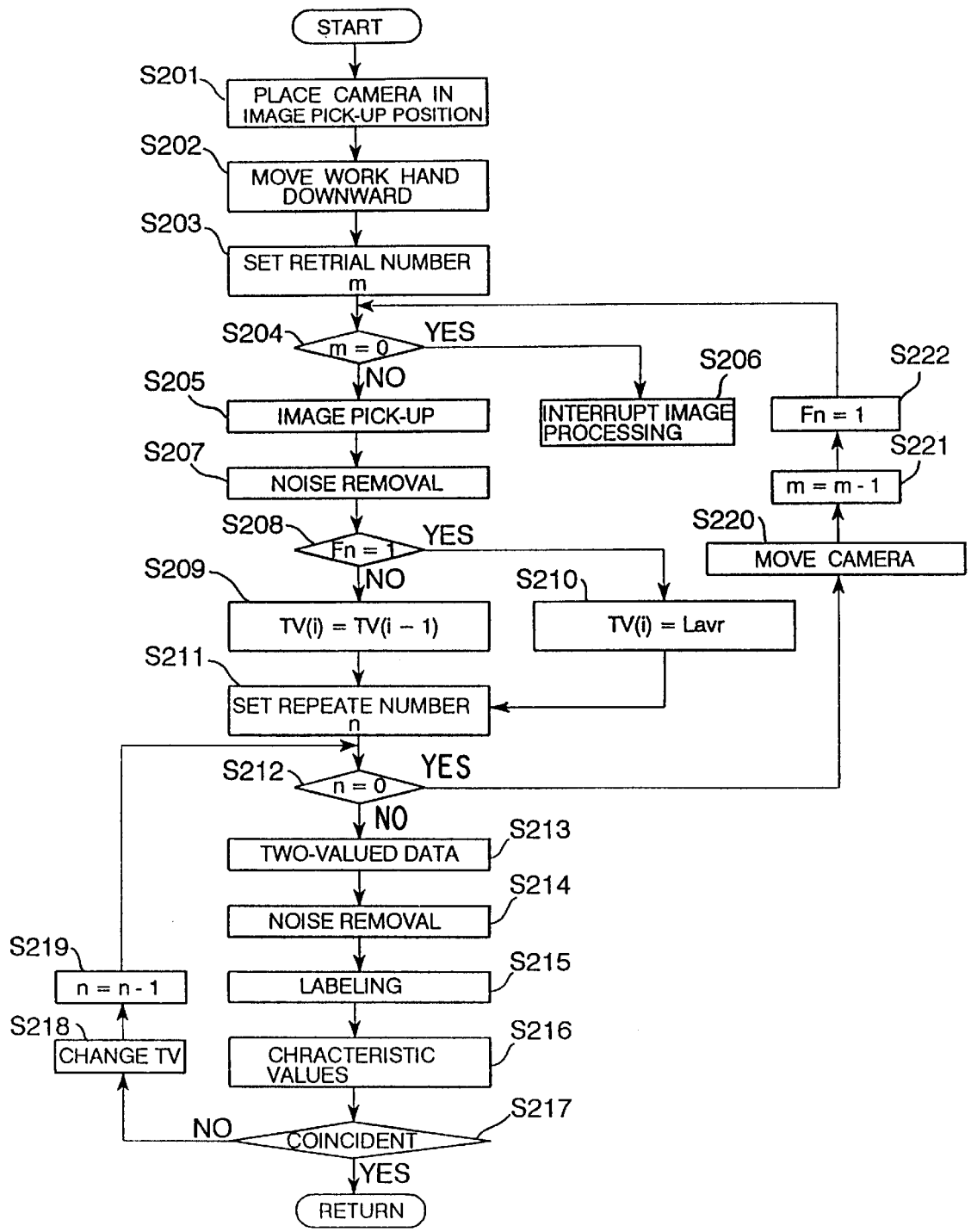

METHOD OF AND SYSTEM FOR WORK TRANSPORTATION CONTROL

This application is a continuation of application Ser. No. 08/360,933, now abandoned, filed Dec. 21, 1994.

BACKGROUND OF THE INVENTION

1. Field of the Invention

The present invention relates to a method of and a system for work transportation control and, more particularly, to a method of and a system for controlling a work handling apparatus to transport works onto a work transportation line.

2. Description of Related Art

It has been widely popular for a long time in so-called production lines, such as automobile production or assembly lines, to use work handling apparatuses or robots to automatically load a transportation conveyer with blanks or finished components, such as cylinder blocks, transmission cases and the like, for transportation to a work station. The work handling apparatus holds works placed on a stack of work pallets at a work store and loads the belt conveyer with one work after another. Such an automatic work handling system is known from, for instance, Japanese Unexamined Patent Publications No. 61-55016, 2-180573 or 3-95025.

A work transportation control system controls a work handling apparatus of this kind to handle works at timed intervals. Since the works are not always placed in the same positions on the pallets, it is necessary to automate and simplify, as far as possible, positioning of the work handling apparatus relative to these works. In order to provide for an optimum utilization of the work handling apparatus, the work transportation control system is provided with a means for detecting work positions.

One of the approaches to position detection is to use electronic image analysis to recognize the position of a work based on a distribution pattern of picture elements of a two-valued image to which a many-valued image of the work is electronically transformed. Specifically, an image is broken with a threshold level into dark and bright picture elements and these dark and bright picture elements are numerically valued at zero (0) and one (1), respectively. This teaching alludes to generalized techniques for assuring consistant position detection of works.

There have also been known work handling apparatuses having a pair of work handling units for handling shafts or spindles including holding means which are adjustable according to lengths or diameters of these shafts or spindles. Such a work handling apparatus is known from, for instance, Japanese Unexamined Utility Model Publication No. 5-26281.

While the work transportation control system may have advantages over the prior art, nevertheless, various constraints must be imposed upon the number of work types which are different in standards, dimensions, shapes and/or attributes. In so-called multi-kind small quantity production lines, where different types of productions such as, for instance, automobile cylinder blocks having different numbers of cylinders or different distances between adjacent cylinders are assembled, it is necessary to permit changing and/or readjusting of a work handling tool and altering of an operation of the work handling tool according to replacement of one type of works with another. This is known as "rearrangement". Rearrangement is an irritating manual operation which follows an alteration of work type. In the course of increasing both automation of multi-kind small quantity production lines and production efficiency, it is necessary to automate and simplify rearrangement as far as possible.

SUMMARY OF THE INVENTION

It is an object of the present invention to provide a method of and system for automatically performing rearrangement in work transportation lines.

It is another object of the present invention to provide a method and system which can increase automation of production lines and production efficiency.

The above objects of the present invention are achieved by providing a work transportation line control method and a system therefor for controlling a work handling apparatus to hold different types of works on pallets placed one on top of another in a stack and load a work transportation line with them in timed sequence. A work type alteration, from one to another, is recognized by comparing specified attribute or characteristic data of a subject work, which is provided based on a two-valued image of the subject work, with predetermined reference attributes or characteristic data. Upon an instruction of a work type alteration, the predetermined reference attributes are replaced with other predetermined reference attributes intrinsic to a work type to which a subject work is changed so as to change the operation of the work handling apparatus, thereby adapting the work handling apparatus to operate suitably according to the type of work. The specified attributes of the subject work is compared to reference attributes of different work types which have been previously stored so as to recognize a type to which the subject work is altered.

The work transportation line control system includes a camera, mounted on the work handling apparatus located immediately before the work transportation line, which forms an image of a subject work to be transported to the work transportation line.

The instruction for rearrangement may be provided based either on data from a work station preceding the work handling apparatus or on data from a work station following the work handling apparatus. The work handling apparatus includes a work hand changeable, or otherwise adjustable, according to different types of works whenever a work alteration occurs.

With a method and a system for work transportation control according to the present invention, reference attributes to be compared to specified attributes of a subject work are changed every time a subject work is changed in type. As a result of this data comparison, the operation of the work handling apparatus is changed so as to be suitable for the subject work after a work type alteration. Accordingly, rearrangement of the work transportation line is automatically achieved, increasing automation of the production line and its production efficiency.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIGS. 11A and 11B show a flow chart illustrating a work transportation control main routine for a microcomputer of the control system;

FIG. 13 is a flow chart illustrating an image processing subroutine for a microcomputer of the control system which is applied to works such as engine cylinder blocks.

DESCRIPTION OF THE PREFERRED EMBODIMENT

Figure 1:
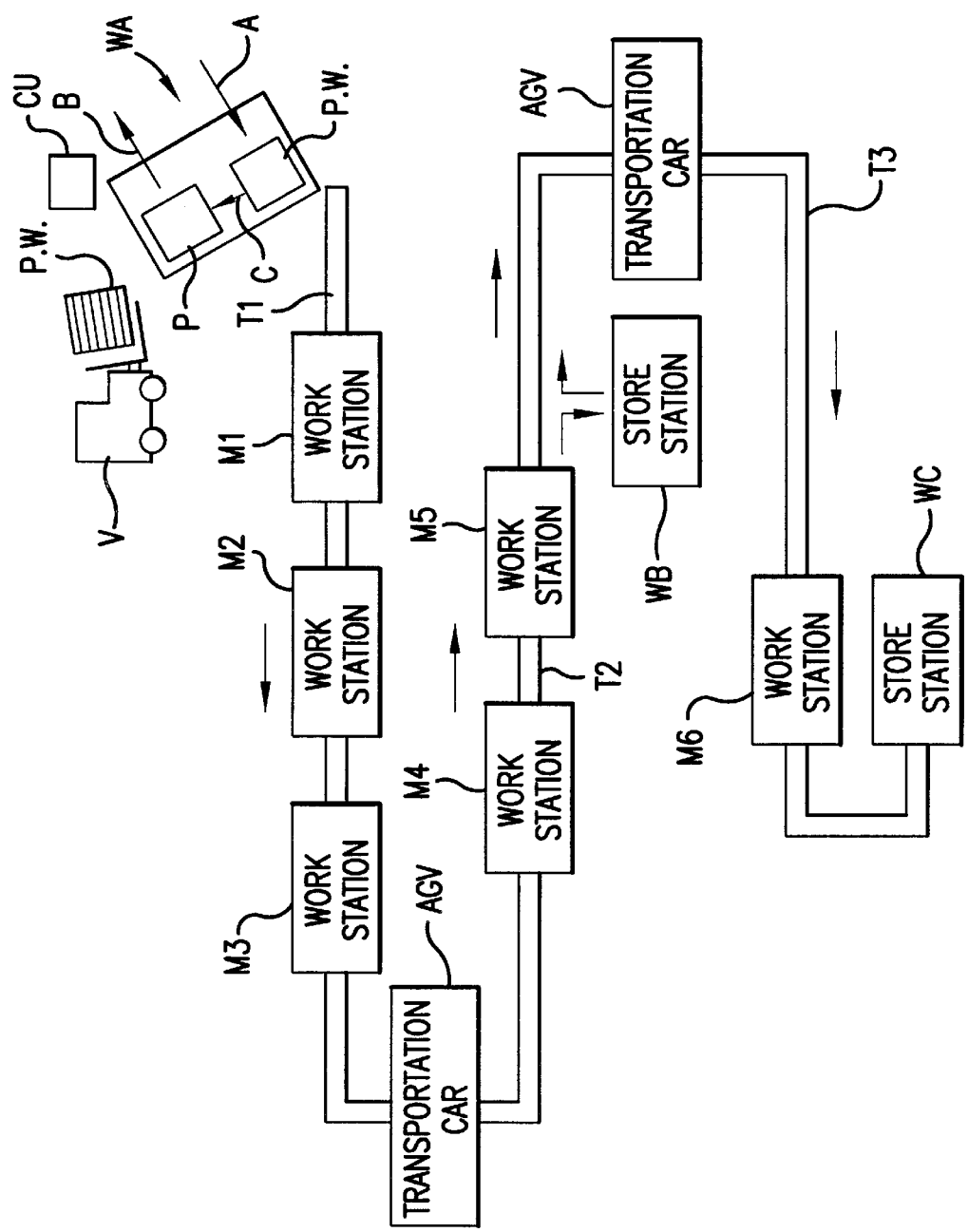
FIG. 1 is an illustration showing a layout of an automotive engine production line.
Figure 2:
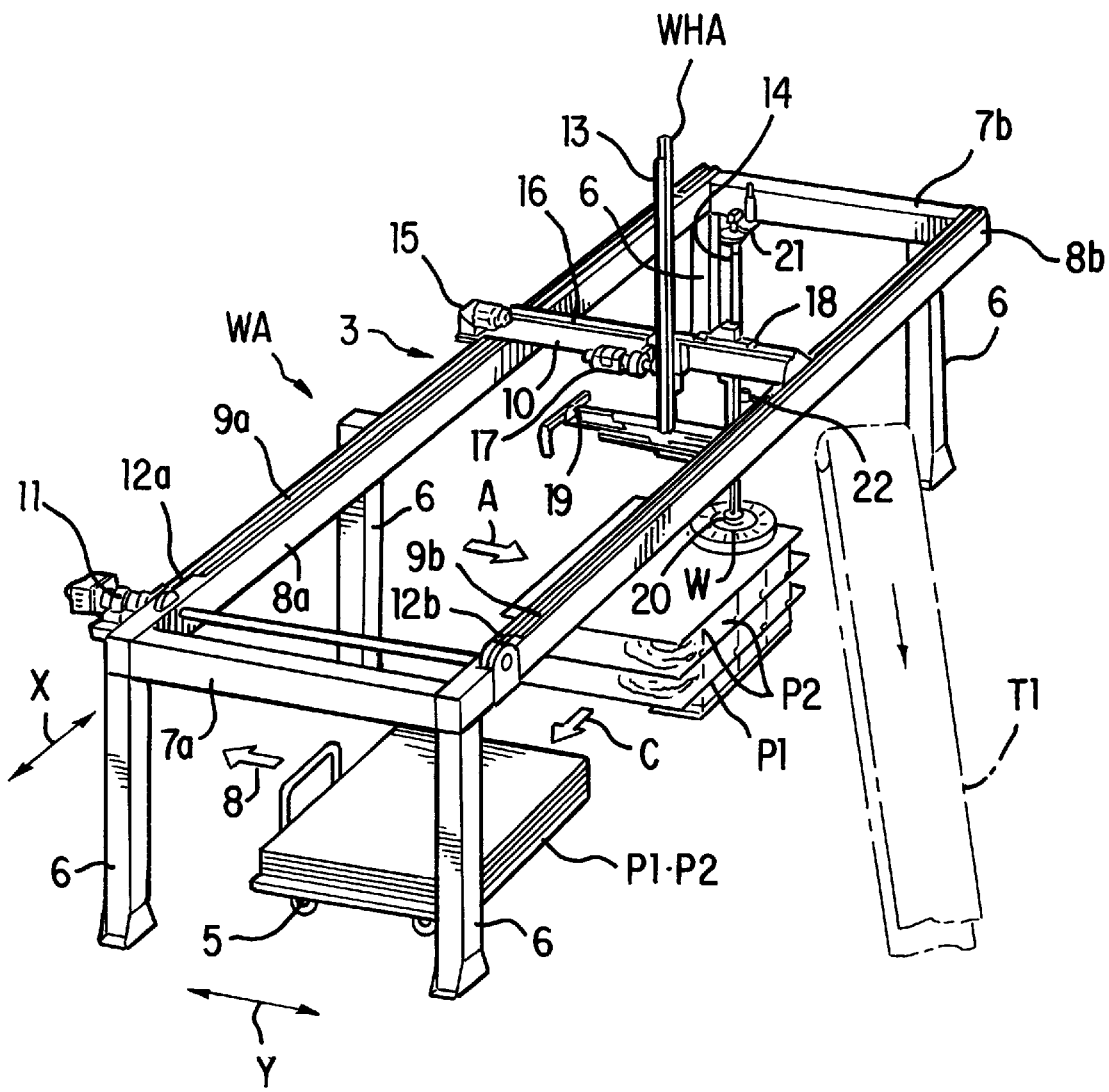
FIG. 2 is a perspective view of a work transportation system with a work transportation control system in accordance with a preferred embodiment of the method of the present invention.

Referring now to the drawings in detail, and in particular, to FIG. 1, which schematically illustrates an automobile production line, a work loading station WA is located at one end of the line at which a stack of works and pallets P.W. is positioned. The works and pallets are provided one on top of another. Each pallet has a work W, for instance a cast cylinder block for an automobile engine unit, placed thereon. The stack of works and pallets P.W. is brought to the work loading station WA by a transport car, such as a fork lift car V. The work loading station WA is installed with a control unit panel CU for manually changing a timed sequence program for the production line. The works and pallets P.W. of a stack are transported to the work loading station WA and placed in close proximity to the end of a first work transportation line T1. The works W on each pallet are loaded on the first work transportation line T1, one after another. The unloaded pallet P is disposed out of the work loading station WA.

The production line has a first group of work stations M1–M3 disposed at separations along the first work transportation line T1. After the last work station M3 of the first group, there is driverless transportation car AGV on a transitional line between the first work transportation line T1 and a second work transportation line T2. The production line further has a second group of work stations M4 and M5 disposed at separations along the second work transportation line T1 and a work station M6 on a third work transportation line T3. Similarly, there is another driverless transportation car AGV on a transitional line between the second work transportation line T2 and the third work transportation line T3. The work stations M4 and M5 include, for instance, a cylinder bore forming station and a sub-assembling station where engine parts, such as spark plugs, are assembled to engine units as the works W. After the work station M5, the works W are temporarily stored, as half-finished products, at a temporary store station WB. From the store station WB, a requested number of the works W are timely loaded by the driverless transportation car AGV on the third work transportation line T3. After the work station M6, which may, for instance, be a final assembly station, the works W are stored as finished products at a product store station WC.

Referring to FIGS. 2 to 5, it will be seen that the work loading station WA includes a work store comprising a stack of works and pallets P.W. These works and pallets P.W. of the stack include a base pallet P1 and a plurality of general pallets P2 which are piled loosely on top of a plurality of works W placed on another pallet P2. The stack of works and pallets P.W. is transported by a lifting device (not shown), such as a forklift truck, into the work loading station WA in a direction shown by an arrow A in FIG. 2 and placed in a specified position. At the work loading station WA, a work handling apparatus WHA, which will be described in detail later, automatically transports the works W placed on the pallet P2, one after another, and loads the first work transportation line T1 such as, for instance, a conveyor belt with them. Thereafter, the work handling apparatus WHA transports each pallet P1 or P2 in a direction C perpendicular to the direction A and automatically deposits empty pallets P1 and P2 on a hand truck 5, or otherwise a belt conveyer, one after another. When the hand truck 5 is loaded with an empty base pallet P1 and a predetermined number of the empty pallets P2 on the base pallet P1, it is carried out of the work loading station WA in a direction indicated by an arrow B in parallel with but opposite to the direction A and subsequently replaced with another empty hand truck 5. On the other hand, another stack of works and pallets P.W. is transported by the lifting device into the work loading station WA in the direction A. In this instance, the direction in which stacks of works and pallets P.W or stacks of pallets P1 and P2 are transported into or out of the work loading station WA is identical with a transverse direction Y of the work loading station WA, and the direction in which pallets P1 and P2 are transferred from a stack at position A to a stack at position B in the work loading station WA is identical with a lengthwise direction X of the work loading station WA.

Figure 3:
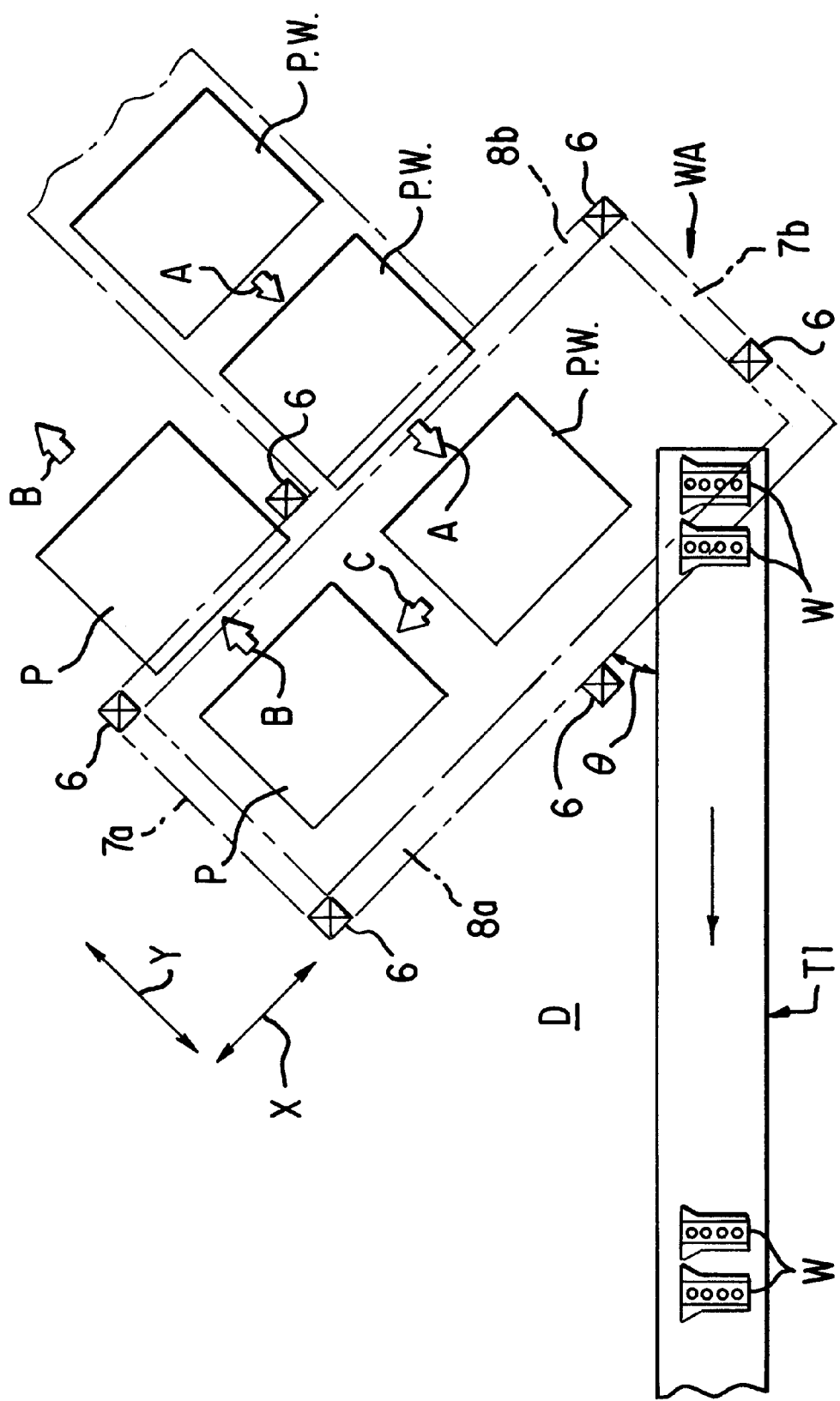
FIG. 3 is a schematic plan view of the work transportation station.
Figure 4:
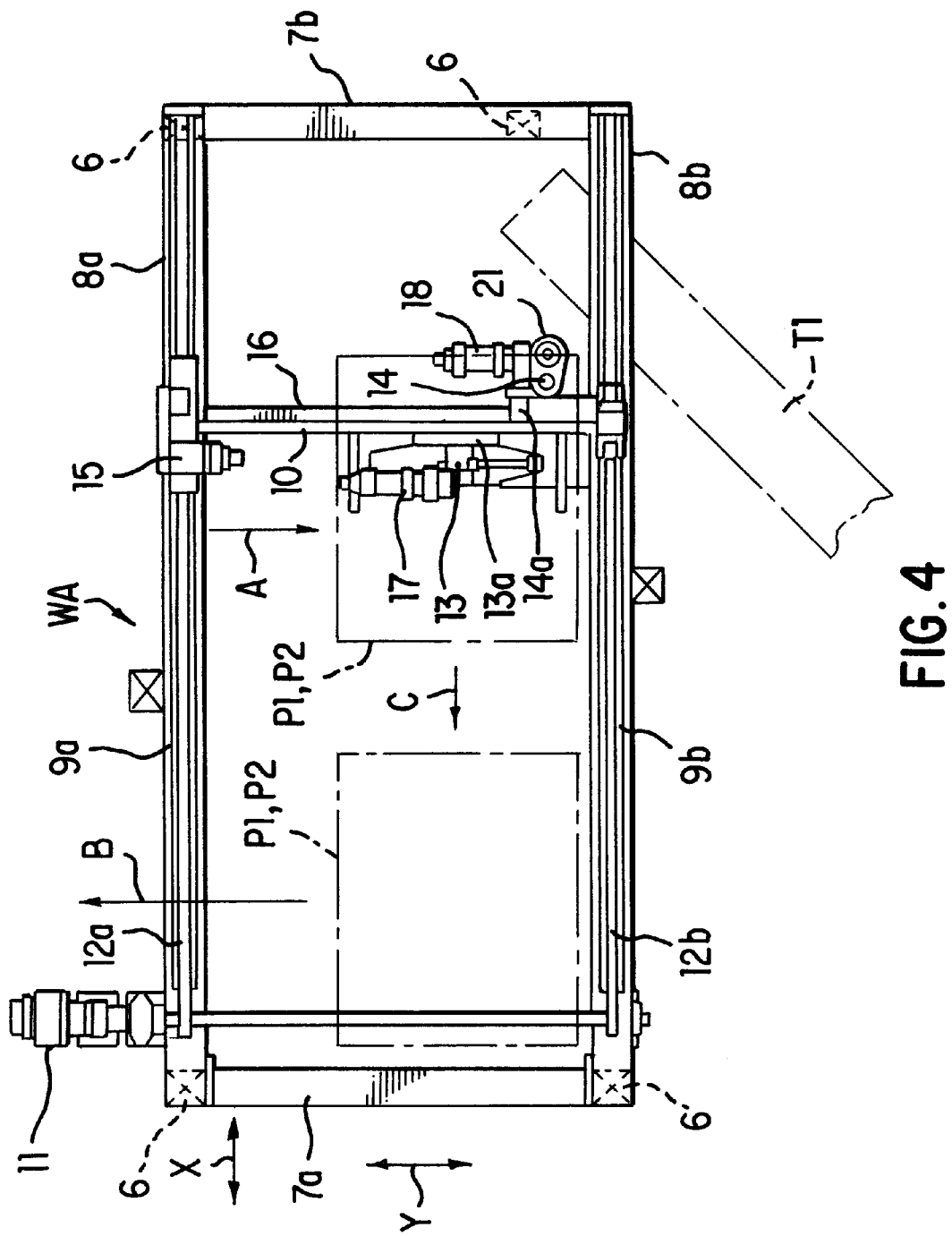
FIG. 4 is a schematic plan view of the work transportation system of FIG. 1.

As seen in FIG. 3, the first transportation line T1, which may comprise a plurality of chain conveyers, is laid so as to place its one end at a corner of the work loading station WA where it is loaded with works W and extends in a straight line to the work station T1 of the first group at a predetermined angle θ, for instance 45 degrees, with respect to the lengthwise direction X of the work loading station WA. This lay-out of the first transportation line T1 forms a triangular work area D between the loading station WA so as to provide easy access for an operator or a worker to the work loading station WA and/or the first transportation line T1 for maintenance.

The work loading station WA has a generally rectangularly shaped frame 3 comprising a pair of longitudinal side beams 8a and 8b, disposed in parallel with each other, and first and second or front and rear cross beams 7a and 7b extending transversely between and connecting the side beams 8a and 8b to each other. This frame 3 is supported by a plurality of legs 6 extending downward from one of the side beams, namely the side beam 8a, and the front and rear cross beams 7a and 7b. The side beams 8a and 8b are provided with guide rails 9a and 9b, respectively, secured to the upside thereof. A movable gantry 10 extends transversely across the side beams 8a and 8b and is guided on the guide rails 9a and 9b for slide movement in a lengthwise direction of the frame 3 between the front and the back. A drive motor 11 secured to the outer side of the side beam 8a and a pair of drive chains 12a and 12b connected to opposite ends of the movable gantry 10, which form a gantry drive mechanism, drive the gantry 10 back and forth in the lengthwise direction on the guide rails 9a and 9b.

Figure 5:
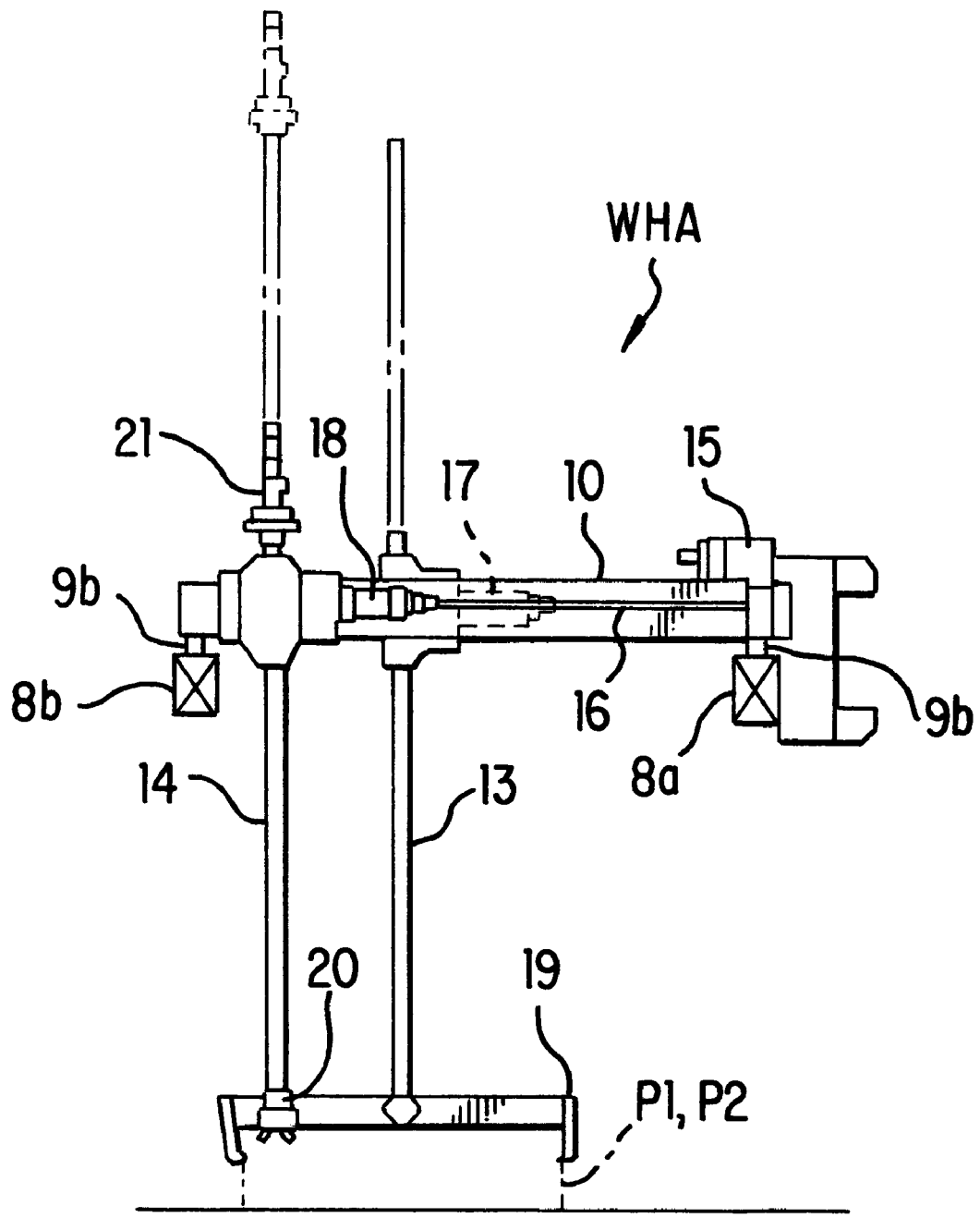
FIG. 5 is a schematic side view of the work transportation system of FIG. 1.
Figure 6A:
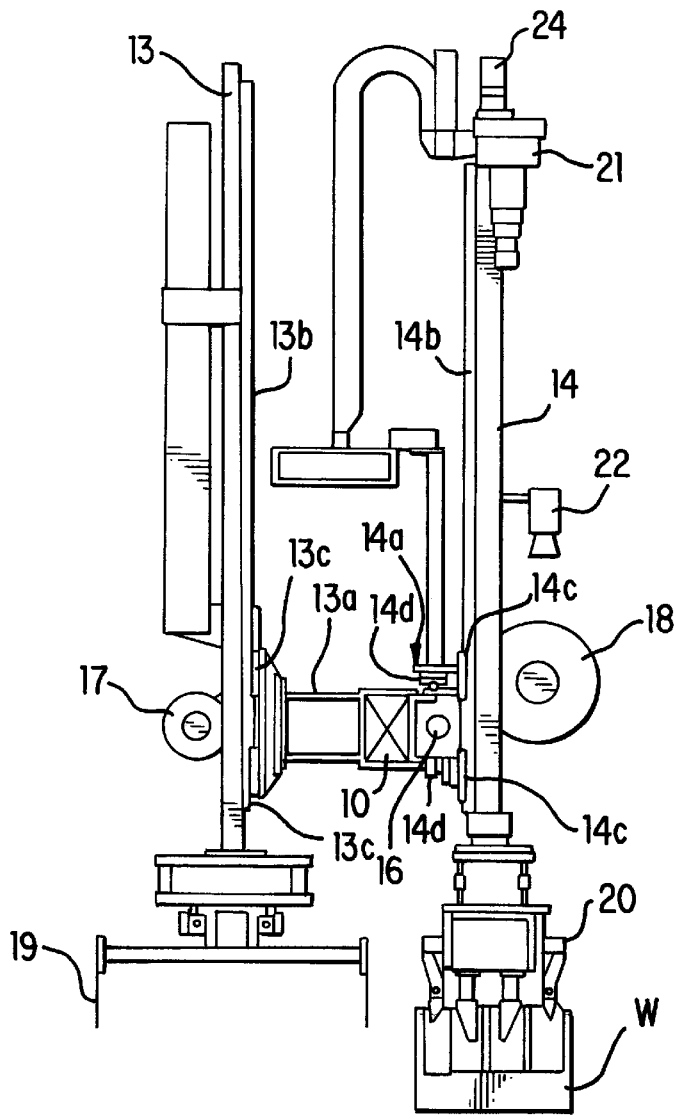
FIG. 6A is a side view of a robot hand unit including a work hand and pallet hand.
Figure 6B:
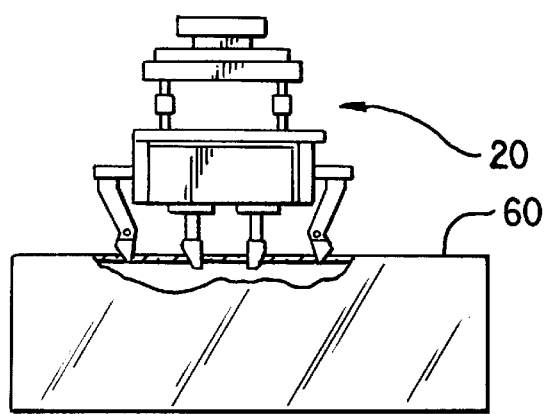
FIG. 6B is an explanatory view of a work hand exchange table.

Referring to FIGS. 5, 6A and 6B, the works W, for instance transmission cases in this embodiment, are individually picked up from the pallets P1 or P2 by a work handling apparatus WHA and loaded on the first transportation line T1. The work handling apparatus WHA is supported for vertical movement by the gantry 10. Specifically, the work handling apparatus WHA includes a pallet hand 19 and a work hand 20. The pallet hand 19 is connected to the lower end of an arm 13 having a slide rod 13b which vertically extends and is supported for vertical movement by means of bearings 13c. These bearings 13c are secured to a guide holder 13a secured to the front side of the gantry 10, so that the pallet hand 19 is moved up and down by an arm drive motor 17. The work hand 20 is connected to the lower end of a vertical arm 14 having a slide rod 14b which vertically extends and is supported for vertical movement by means of bearings 14c. These bearings 14c are connected to a guide holder 14a mounted for slide movement on the rear side of the gantry 10. Through the support structure of the work hand 20, the work hand 14 is supported by the gantry 10 so as to move and turn about a vertical center line of the vertical arm 14. The gantry 10 is provided with a drive motor 15 operationally coupled to the guide holder 14a by means of a drive chain 16 so as to cause transverse slide movement of the guide holder 14a on the gantry 10 and an arm drive motor 18 for causing vertical slide movement of the arm 14 on the guide holder 14a. The arm 14 for the work hand 20 is provided at its top end with an arm drive motor 21 for causing a turn of the arm 14 about the vertical center line and at the middle with a video camera 22 for monitoring the pallet P1 and P2 with the works W placed thereon. There is prepared a plurality of different work hands 20 on a hand table 60. The work hand 20 attached at any particular time to the work handling apparatus WHA is replaced with any one of these work hands 20 whenever a work alteration is made. This work hand replacement takes place in a work and pallet handling main routine, which will be described in detail later.

Figure 7:
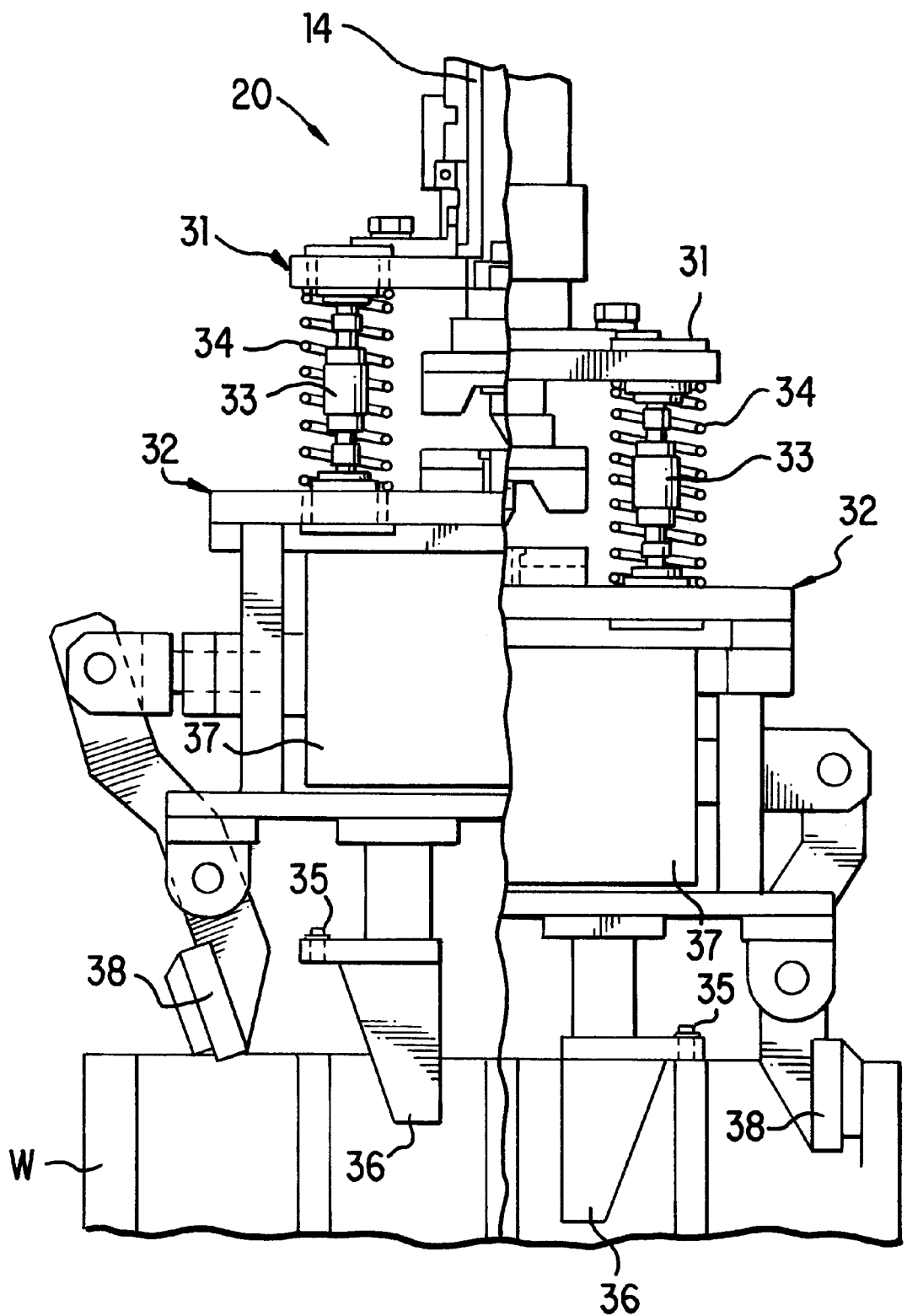
FIG. 7 is an explanatory view of the work hand as viewed from the front.
Figures 8A, 8B:
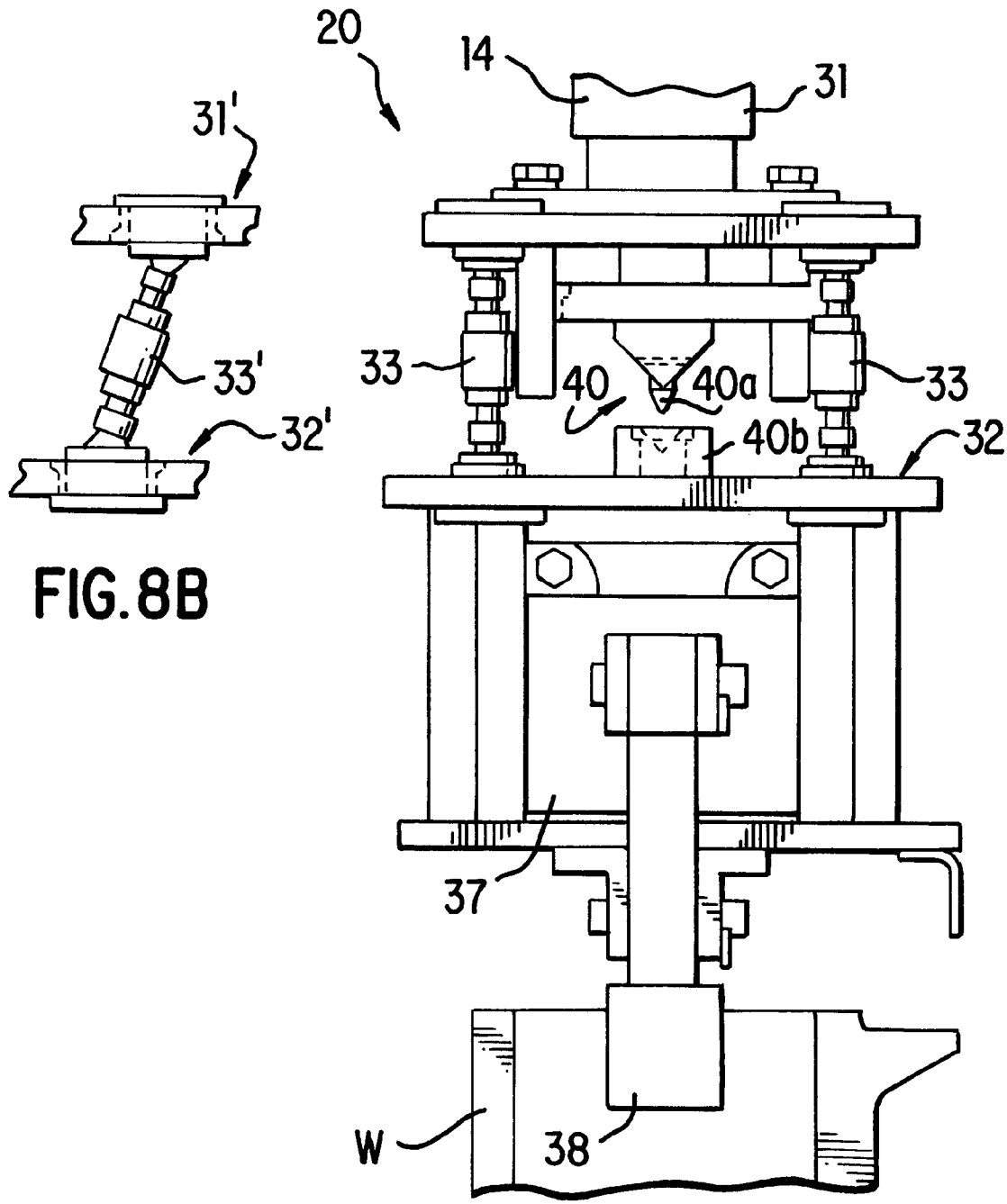
FIGS. 8A and 8B are explanatory views of the work hand as viewed from the side.

Referring to FIGS. 7, 8A and 8B, in which a cylinder block is depicted as a work W, showing details of the work hand 20, a hand unit 32 is connected to the lower end of the arm 14 by means of a universal joint unit 31 so as to be displaced perpendicularly with respect to the arm 14. As will be described in detail later, the universal joint unit 31 includes a pair of ball joints 33 and coil springs 34. The hand unit 32 has a pair of position stabilizing fingers 36 provided with contact switches 35 and a pair of holding fingers 38. The holding fingers 38 are driven by a pneumatic cylinder 37 so as to be brought into engagement with specified parts of the work W, such as cylinder bores of a cylinder block, and disengaged from the work W, thereby holding and releasing the work W. The position stabilizing fingers 36 stabilize the work W in position on the pallet P1 or P2 while the holding fingers 38 try to hold it.

Figure 9:
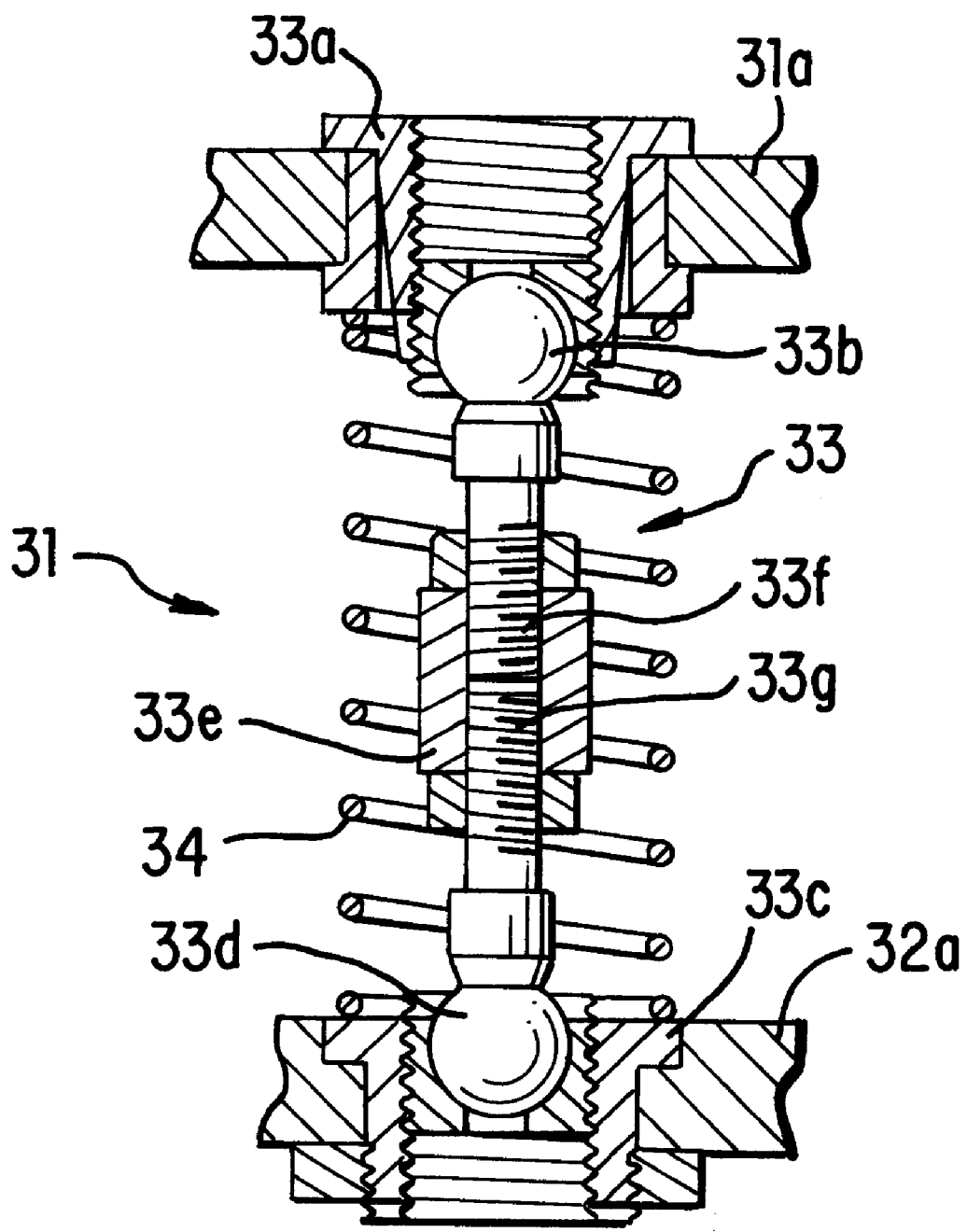
FIG. 9 is an explanatory view of a universal joint unit of the work hand as viewed from the front.

As shown in FIG. 9, the ball joint 33 includes first and second link balls 33b and 33d and a liner shaft coupling means comprising first and second liner rods 33f and 33g. The first link ball 33b, to which the first liner rod 33f is secured, is received within a first socket 33a secured to an attachment plate 31a through which the work hand 20 is connected to the lower end of the arm 14. Similarly, the second link ball 33d, to which the second liner rod 33g is secured, is received within a second socket 33c secured to an attachment plate 32a through which the hand unit 32 is connected to the universal joint unit 31. These first and second liner rods 33f and 33g are received for slide movement within a cylindrical tube 33e. The universal joint unit 31, thus structured, provides a relative horizontal displacement between the attachments 31a and 32a as shown in FIG. 8B, and hence between the hand unit 32 and the arm 14. Accordingly, it is ensured that the hand unit 32 will hold the work W even if it is not in position with respect to the arm 14. The universal joint unit 31 is further provided with a steady rest mechanism 40 which couples the universal joint unit 31 and the hand unit 32 mechanically together so as to prevent any relative horizontal displacement between the universal joint unit 31 and the hand unit 32 while the work hand 20 holds the work W and transports it. The steady rest mechanism 40 comprises a retractable rest pin 40a held by the attachment 31a of the universal joint unit 31 and a receptacle 40b secured to the attachment plate 32a of the hand unit 32. When the rest pin 40a is brought into engagement with the receptacle 40b, the universal joint unit 31 and the hand unit 32 are mechanically coupled together.

Figure 10:
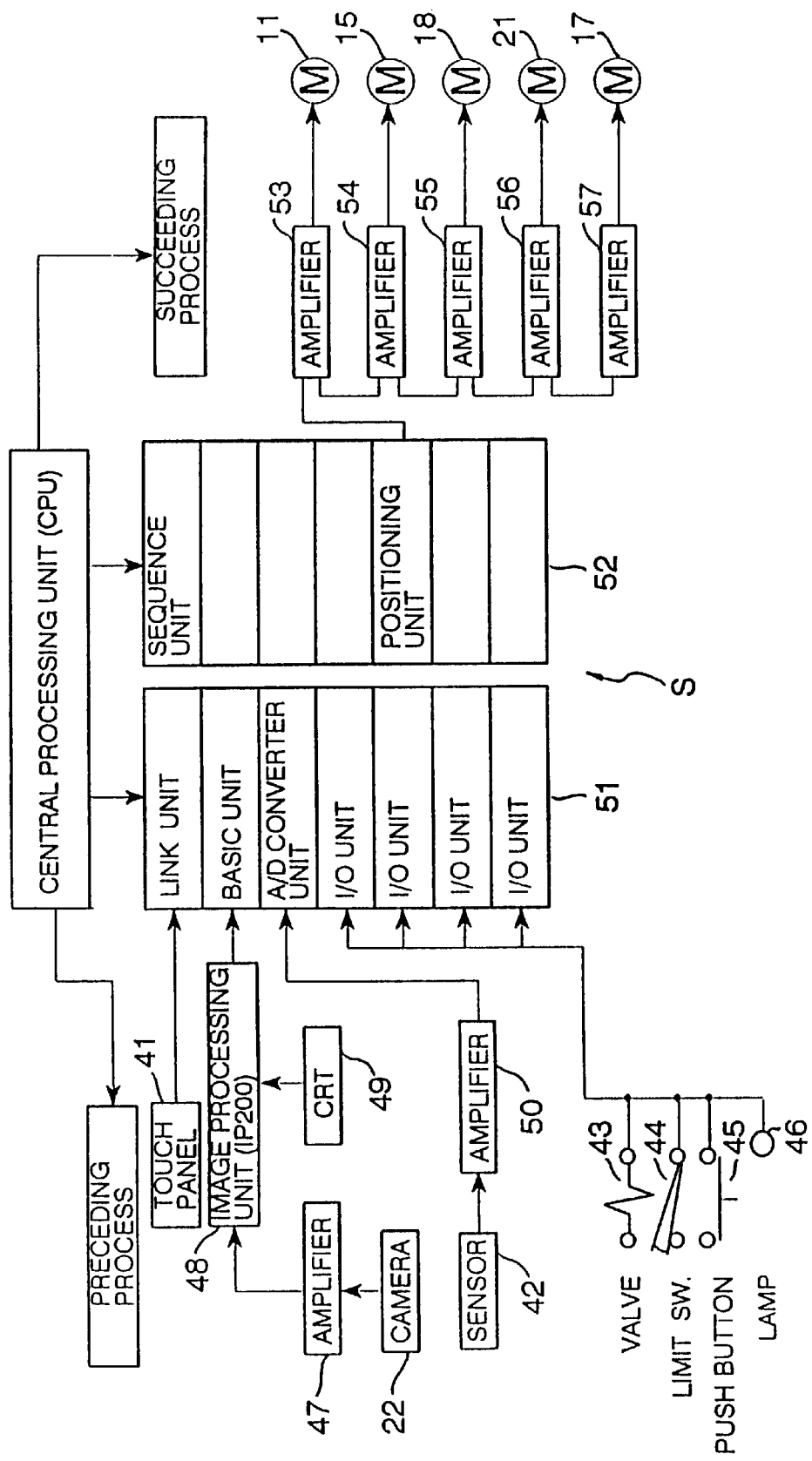
FIG. 10 is a block diagram of a control system for the work transportation system of FIG. 1.

FIG. 10 illustrates a control system S for controlling the operation of the work handling apparatus WHA. The control system S, which is formed mainly by a microcomputer, includes first and second controllers 51 and 52. The first controller unit 51 has a dominant link unit, a basic subunit, an A/D converter unit and a plurality of I/O units. This dominant link unit links the first and second controllers 51 and 52 so as to govern intercommunication between them. The dominant link unit receives signals from a touch panel 41 entered by an operator. The basic unit receives video data representative of an image picked up by the video camera 22 and an amplifier 47, and processed by an image processing unit 48. As will be described later, the image processing unit 48 transforms an image of the work W picked up by the video camera 22 to two-valued data from many-valued data with a specified threshold limit value for the purpose of finding specified contoured portions of the work W and a position of the work W from the two-valued data representative of the image. The data representative of work position is displayed on a CRT display device 49. The A/D converter unit receives a signal from a sensor 42 through a sensor amplifier 50. This signal represents the distance between the pallet hand 19 and the uppermost pallet P2 of the stack right below the pallet hand 19, or desirably the distance between the work hand 20 and the work W placed on the uppermost pallet P2 of the stack right below the work hand 20. Connected to the I/0 units are a valve 43, a limit switch 44, a push button 45 and a lamp 46, respectively.

The second controller 52 has a sequence control unit for sequential control of the various drive mechanisms, such as the gantry drive motor 11, the guide holder drive motor 15, the arm drive motors 17, 18 and 21, and robot hand drive means (not shown) for the hands 19 and 20. The second controller 52 further has a position control unit for driving and controlling the motors 11, 15, 17, 18 and 21 through first to fifth amplifiers 53–57, respectively, so as to move the hands 19 and 20 in any desired position.

The operation of rearrangement for the work handling apparatus WHA depicted in FIGS. 1 through 10 is best understood by reviewing FIGS. 11A and 11B, 12 and 13, which are flow charts illustrating various sequence routine and subroutines, respectively, for the microcomputer of the control system S. Programming a computer is a skill well understood in the art. The following description is written to enable a programmer having ordinary skill in the art to prepare an appropriate program for the microcomputer. The particular details of any such program would, of course, depend upon the architecture of the particular computer selected.

Main Routine

Figure 11B:
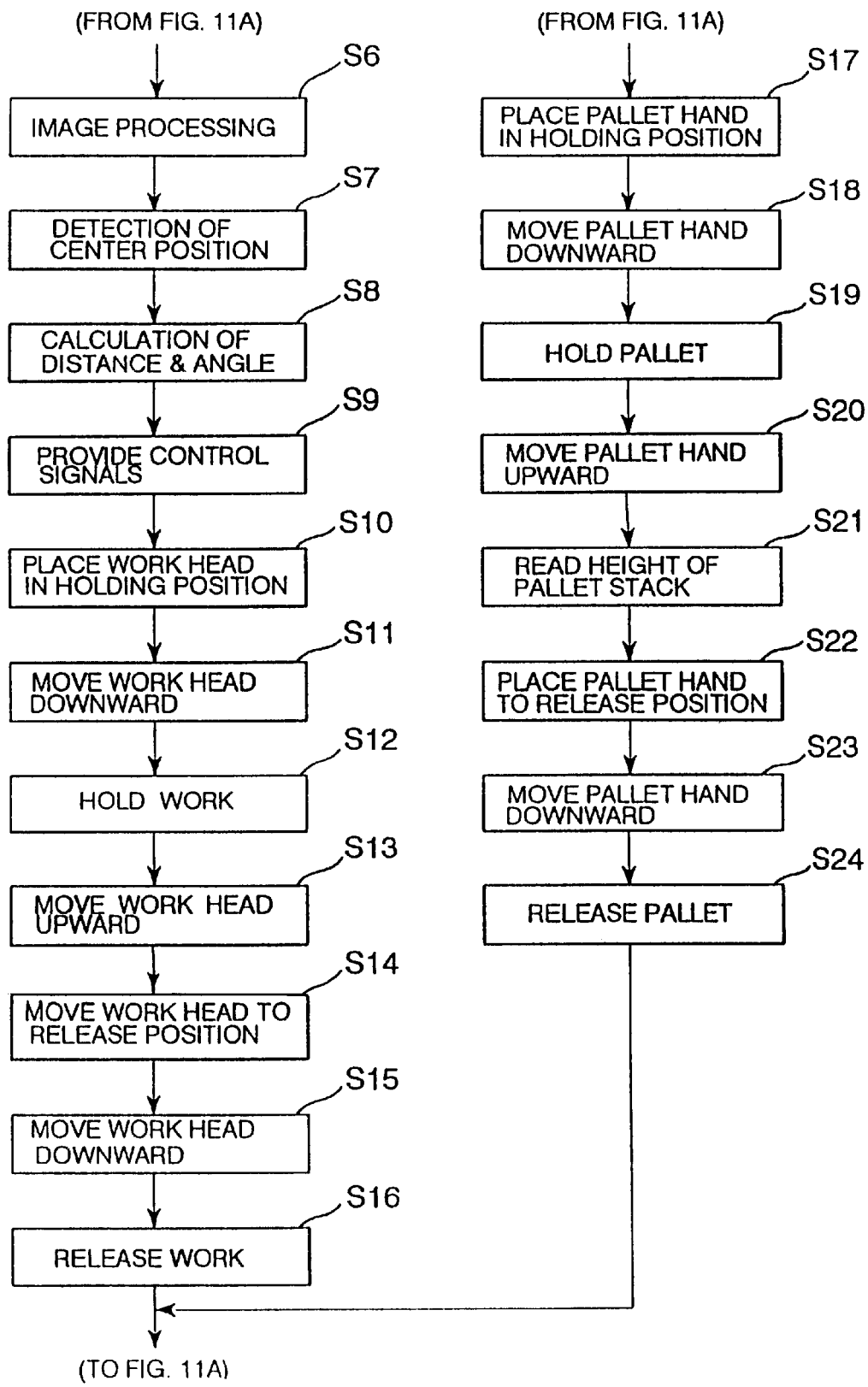
Figure 12:
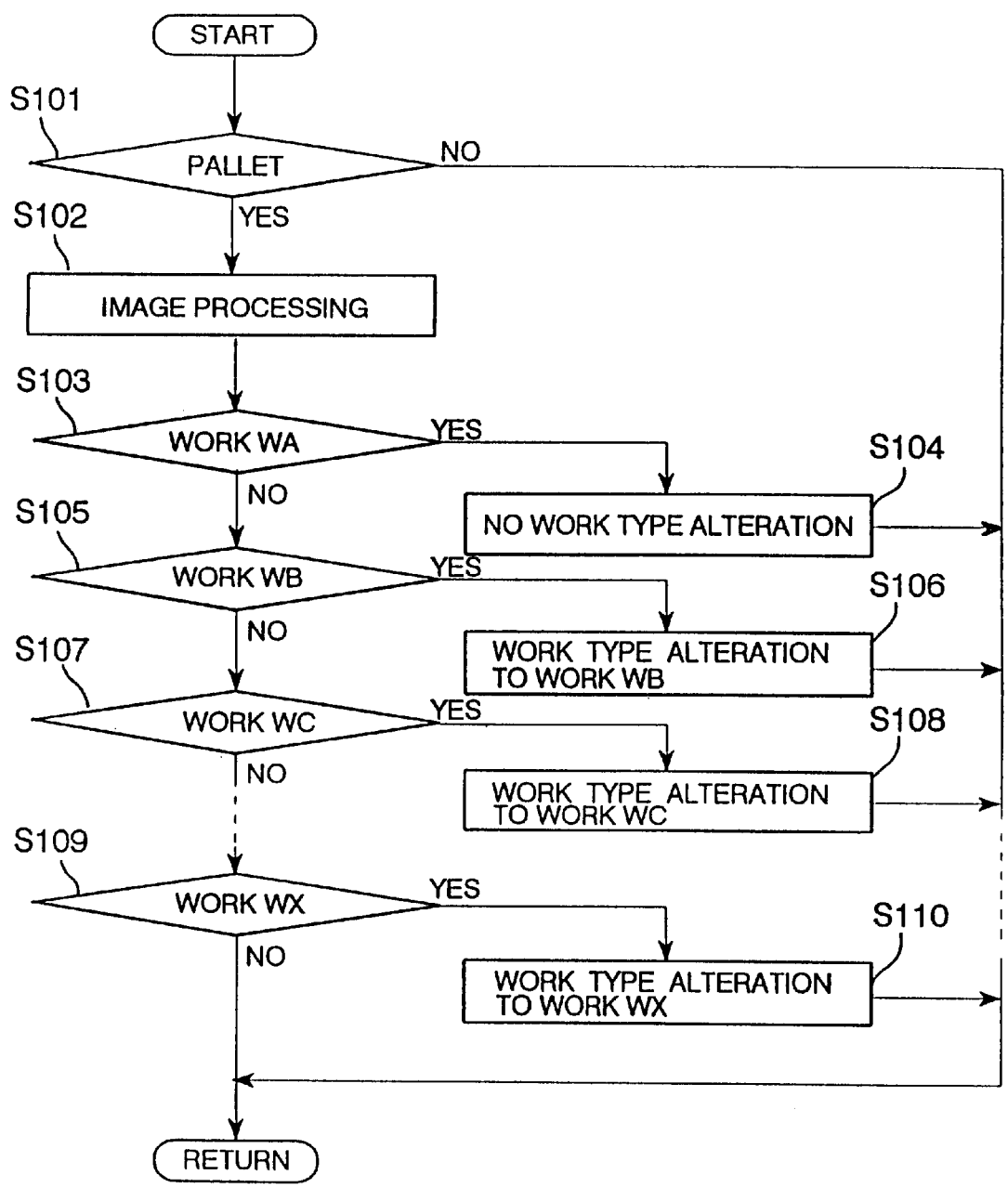
FIG. 12 is a flow chart illustrating a work type alteration detection subroutine.

Referring to FIGS. 11A and 11B, which is a flow chart of the work and pallet handling main routine, the flow chart logic commences and control passes directly to a function block S1 where a work type alteration detection subroutine illustrated in FIG. 12 is called for to provide a rearrangement instruction signal according to alteration of work type from one to another.

Work Type Alteration Detection Subroutine

FIG. 12 is a flow chart illustrating the work type alteration detection subroutine. The first step at step S101 in FIG. 12 is to make a decision as to whether a pallet P1 or P2 has been moved from the stack of works and pallets P.W. in the last sequence of operation of the work handling apparatus WHA. If the answer to this decision is "NO," this indicates that there is at least one work W on the pallet P1 or P2 which is identical in work type with the work W handled by the work handling apparatus WHA in the last sequence of operation, ie., that there has not occurred any work type alteration. Then, the step S101 orders return to the main routine, before the step in the maine routine calling for the work type alteration detection subroutine. On the other hand, if the answer to the decision is "YES," this indicates that there are works W which are possibly different in work type from the work W handled and removed from the stack by the work handling apparatus WHA in the last sequence of operation. Then, an image processing subroutine is called for at step S102 to provide data relating to the contour of a work W to be handled by the work handling apparatus WHA. The work contour is identified based on two-valued image data to which an image representative of a work W provided by means of the camera 22 is transformed from many-valued image data with the utilization of a specified threshold value.

Image Processing Subroutine

FIG. 13 is a flow chart of the image processing and work position detection subroutine. The first step at step S201 is to drive the gantry drive motor 11 and the guide holder drive motor 15 to shift the gantry 10 by a specified distance in the lengthwise direction X of the frame 3 and the guide holder 14a by a specified distance in the transverse direction Y so as to place the camera 22 in the image pick-up position at which the camera 22 positions the center of the field of view so that is approximately coincident with the center of the top surface of the work W. At step S202, the arm drive motor 18 is subsequently driven to lower the arm 14 of the work hand 20 by a specified distance so as to locate the camera 22 in a vertical position suitable for picking up an image of the top surface of the work W. Subsequently, a counter sets its count to a predetermined initial count "m", which represents the number of image picking-up retrials, at step S203. The count change is made by a decrement of one (1) at step S221 every time the horizontal camera position is changed so that the camera 22 approaches a position at which it can pick up an image of a work W. Such a change in horizontal camera position is made when the detection of work contour is still unsuccessful after a predetermined number of times of alterations in threshold limit value. When the counter has changed its count to zero (0), the control system S determines that the image processing is unable to be done at step S206.

After initially setting the count "m" of the counter at step S203, a decision is made at step S204 as to whether the count "m" of the counter has reached zero (0). If the answer to the decision is "YES," this indicates that the camera 22 has been shifted in position "m" times. Then, the control system S determines that image processing is unable to be done and interrupts the image processing at step S206. On the other hand, if the answer to this decision is "NO," then, the camera 22 picks up a chiaroscuro image of the work W and provides many-valued image data representative of the chiaroscuro image at step S205. Noises are subsequently removed from the image data at step S207. A decision is made at step S208 as to whether a flag Fn has been set to a state of one (1) or ON. The flag Fn is set to the state of one (1) when the detection of work position is still unsuccessful after the predetermined number of times of alterations in threshold value. If the flag Fn has not yet been set to the state of one (1), the initial threshold value TV(i-1), previously established, is substituted for another initial threshold value TV(i) at step S209. The reason for the substitution of the previous threshold value TV(i-1) for the initial threshold value TV(i) is that the previous threshold value TV(i-1) leaves the detection of work position possible. However, if the flag $F_n$ has been set to the state of one (1), this indicates that neither the initial threshold value TV(i) nor a minor change in threshold value can make it possible to detect the position of the work W. Then, an average luminance Lavr is substituted for another initial threshold value TV(i) at step S210. It is to be noted that the average luminance Lavr is defined as an average of luminance of the entire area of the chiaroscuro image picked up by the camera 22. In this instance, the solid part of the top of the work W appears light on the chiaroscuro image, and a specific contour of portions, such as circular bore portions of the top of a cylinder block forming the work W, are shaded or dark on the chiaroscuro image.

After setting the initial threshold value TV(i) at step S209 or step S210, a predetermined initial count "n" of another counter is set at step S211. In this instance, the other counter changes the count "n" by a decrement of one (1) every time the threshold value TV, with which the many-valued image data is transformed to two-valued data, is changed at step S218. Every "n" times of change in threshold value TV causes a shift of horizontal camera position. Subsequently, at step S212, a decision is made as to whether the count "n" of the counter has reached zero (0). If the answer to the decision is "YES," then, after moving the camera 22 horizontally by a predetermined distance for position changing at step S220, the count "m" is changed by a decrement of one (1) at step S221, and the flag Fn is subsequently set to the state of one (1) at step S222. Thereafter, control proceeds again to the decision at step S204.

If the answer to the decision made at step S212 is "NO," the many-valued image data is transformed into two-valued image data at step S213, and noises are removed from the two-valued image data at step S214. For two-valued image data, a value of 1 is assigned for picture elements lighter than the initial threshold value TV(i) and a value of 0 for picture elements darker than the initial threshold value TV(i). The transformation to two-valued image data may be done with respect to a specific wave length of light. Then, labeling is conducted at step S215. The labeling is performed such that a picture element having a value of 1 adjacent to another picture element having a value of 1 is labeled "A" and a group of adjacent picture elements labeled "A" is recognized as a complete portion having a specific contour, i.e. a circle, indicative of the cylinder bore in this embodiment. It is desirable to select portions or parts of the work W having simple contours for the specific contour portions which are recognizable as independent groups of dark, or otherwise light, picture elements. As a result of the transformation of image data to two-valued image data and the labeling of picture elements, all of the specific contour of portions of the image, i.e. the cylinder bores, are recognized.

However, not all of the portions of the image, which are recognized to be of the specific contour, are of a sole work W. For example, if two works W get into a single picture image picked up by the camera 22, then there appear portions having the specified contour of one work and portions having the same specified contour of another work W mingled together in the picture image. For this reason, only the specific contour of a work W is discriminated through steps S216 and S217.

The discrimination of the specific type of a work is made based on contour identification factors. These contour identification factors are previously defined as specified attribute or characteristic values for every work type as follows:

(1) the area of a distinctive portion of the work such as, for instance, a cross-sectional area of a cylinder bore;

(2) the peripheral length of the distinctive portion of the work such as, for instance, an internal peripheral length of the cylinder bore;

(3) the contour coefficient of the distinctive portion of the work such as, for instance, the ratio of area to internal peripheral length of the distinctive portion;

(4) the distance between two adjacent distinctive portions of the work such as, for instance, a center distance between two adjacent cylinder bores; and (5) the relative angle between two straight lines, each of which connects geometrical centers of two adjacent distinctive portions of the work.

There have been previously provided reference data representative of these work type attribute or characteristic values for various work types such as, for instance, different cylinder blocks for various types of engine units, and these data are exchanged from one for a previous work type to another at a request of work type alteration.

After extracting the work type attribute or characteristic values in connection with the subject work type at step S216, a comparison is made between the extracted work type attribute or characteristic values and the reference attribute or characteristic values so as to decide as to whether there is a group of the specific contour portions having work type attribute values in conformity with the reference work type at step S217. If the answer to the decision is "NO," this indicates that the initial threshold value TV(i) for image transformation to two-valued image data was improper. Then, the initial threshold value TV(i) is changed as a threshold value TV at step S218. Subsequently, after changing the count "n" by a decrement of one (1) at step S219, control returns to the decision concerning the count of "n" at step S212. This is because, if the initial threshold value TV(i) is improperly larger or lower, the work type can not be represented by the work type attribute values in conformity with the reference attributes and, consequently, it can not be properly recognized. The change in threshold value TV is alternately changed increasingly or decreasingly from the initial threshold value TV(i).

If the answer to the decision concerning the existence of a group of the specific contour portions in conformity with the reference work type is "YES," this indicates that the group of the specific contour portions belongs to the work W to be transported. Then, the final step orders return to the main routine, after the step in the work type alteration detection subroutine calling for the image processing subroutine.

Work Type Alteration Detection Subroutine-continued

Referring back to the work type alteration detection subroutine in FIG. 12, the contour identification factors of the subject work W are compared to those of each of various work types (WA, WB, WC, . . . , WX) so as to find a work type alteration. Specifically, at step S103, the contour identification factors of the subject work W are compared to those of, for instance, the work WA handled by the work handling apparatus WHA in the last sequence of operation so as to decide if the contour identification factors of both the subject work W and the previous work WA are in conformity with each other. If the answer to this decision is "YES," this indicates that the subject work W and the previous work WA are identical in work type to each other and work type alteration has not occurred at step S104. Then, the sequence returns to the main routine, after the step in the main routine calling for the work type alteration detection subroutine without providing any rearrangement signal. On the other hand, if the answer to the decision made at step S103 is "NO," this indicates that a work type alteration has occurred. Then, at step S105, the contour identification factors of the subject work W are compared to those of any one of the remaining types of works such as, for instance, a work type WB. If the answer to this decision is "YES," this indicates that there has occurred a work type alteration to the work type WB from the work type WA handled in the last sequence of operation. Then, a rearrangement signal is provided at step S106 in order to conduct rearrangement of the work handling apparatus WHA and the sequence returns to the main routine, after the step in the main routine calling for the work type alteration detection subroutine. However, if the answer to the decision made at step S105 is "NO," a similar decision is made at step S107, . . . , or S109 with respect to the remaining work types WC, . . ., or WX so as to provide a rearrangement instruction signal at step S108, . . ., or S110, respectively. The final step orders return to the image processing subroutine.

Main Routine-continued

Referring back to the main routine in FIG. 1A, a decision is made at step S2 as to whether or not there is a rearrangement instruction signal. If the answer to the decision is "YES," this indicates that there has occurred a work type alteration to any one of the work types WB –WX from the work type WA handled in the last sequence of operation and it is necessary for the work handling apparatus WHA to change or readjust the hand unit 32. Then, at step S3, the control system S orders the work handling apparatus WHA either to exchange the work hand 20 to another work hand 20 suitable for the altered type of work W, or otherwise to adjust the work hand 20 so as to be suitable for the altered type of work W. Subsequently, at step S4, the control system S establishes new control parameters, such as a standard position of the work handling apparatus WHA for the altered type of work W, contour identification factors for the altered type of work W, and a threshold value with which an image of a work is transformed to two-valued image data from multi-valued image data.

Thereafter, at step S5, a decision is made as to whether or not the work handling apparatus WHA is expected to perform a loading operation between a work W and a pallet P1 or P2. The loading sequence routine subsequently takes either steps S6 through S16 for loading a work W or steps S17 through S24 for loading of a pallet P1 or P2.

If the answer to the decision made at step S5 is "YES," the loading sequence routine subsequently takes either steps S6 through S16. The first step at step S6 in FIG. 11B is to perform the image processing subroutine in FIG. 13. Based on the contour identification factors obtained at step S216 in the image processing subroutine, the geometrical center position of the subject work W is detected and represented in perpendicular co-ordinates at step S7. Subsequently, the distances and an angle necessary for the work hand 20 to be shifted and turned is calculated based on the geometrical center position represented in co-ordinates at step S8 and signals representative of the distances and angle are provided at step S9. The shift distance and angle are defined by the amounts of rotation of the motors 11, 15 and 21.

Thereafter, at step S10, the motors 11, 15 and 21 are driven according to the distance and angle signals indicating the amounts of rotation so as to place the work hand 20 in a position such that the work hand 20 is ensured to hold the work W. Subsequently, after driving the motor 18 to move the work hand 20 vertically downward toward the work W at step S11, the pneumatic cylinder 37 is actuated to cause the holding fingers 38 of the work hand 20 to hold the work W while the motor 18 rests at step S12. After reversing the motor 18 so as to move the work hand 20 upward at step S13, the motors 11, 15 and 21 are driven again to move the work hand 20 so as to locate the work W in the release position where the first transportation conveyor T1 is located at step S14. While the work hand 20 stays in the release position, the motor 18 is driven again to move the work hand 20 downward at step S15 and the pneumatic cylinder 37 is actuated to cause the holding fingers 38 to release and place the work W on the transportation conveyor T1 at step S16. Thereafter, the motors 11, 15, 18 and 21 are reversed all together to bring back the work hand 20 to its original position.

On the other hand, if the answer to the decision made at step S5 is "NO," this indicates that the object to be transported is the pallet P1 or P2 of the stack. Then, the motor 11 is driven to move the gantry 10 in the lengthwise direction of the frame 3 so as to place the pallet hand 19 in a holding position at step S17, and then the motor 17 is driven to move the pallet hand 19 downward at step S18 so as to locate it right above the pallet P1 or P2 of the stack. After holding the pallet P1 or P2 with the pallet hand 19 at step S19, the motor 17 is reversed to move the pallet hand 19 upward at step S20 so as to lift the pallet P1 or P2 to a predetermined level. At step S21, the height of the stack of pallets P1 and P2 on the hand truck 5 in the release position, which is calculated based on the number of pallets P1 and P2 still on the hand truck 5, and the vertical distance, by which the pallet hand 19 is moved down from the predetermined level based on the height of the stack of pallets P1 and P2, are read. Then, the motor 11 is driven to place the pallet hand 19 with the pallet 2 right above the stack of pallets P1 and P2 on the hand truck 5 in the release position at step S22, and the motor 17 is subsequently driven again to move the pallet hand 19 downward by the vertical distance from the predetermined level at step S23. Thereafter, the pallet hand 19 releases and places the pallet P2 on the top of the stack of pallets P1 and P2 on the hand truck 5 in the releasing position B at step S23. After the work W or the pallet P1 or P2 has been transported, the pneumatic cylinder 37 is actuated to cause the pallet hand 19 to release and place the pallet P1 or P2 on the truck 5 at step S 24. The final step orders return to the function block at step S1.

With the image processing, even if a picture image picked up by the camera 22 includes images of a plurality of works W, such as cylinder blocks, only a group of specific contour portions of a sole work W are discriminated from others and the position of the sole work W is accurately detected based on the attribute values of the group of specific contour portions. Accordingly, the work hand 20 is accurately positioned right above the work W to be transported and holds it properly.

As described above, with the work transportation line control system, the control system S has the image processing unit 48 for transforming an image of a work W picked up by the camera 22 to two-valued data from many-valued data, the first and second controllers 51 and 52, and the touch panel 41 through which an instruction for rearrangement is provided. The first controller 51 has a basic unit including a memory in which data representative of various specific contours of works W are stored, a functional section for comparing a discriminated specific contour of a subject work and the previously stored contours, and a functional section for changing specific contour data of a work W before a work type alteration to specific contour data of a work W after the work type alteration. The second controller 52 controls various motors based on the result of comparisons made at the functional sections of the first controller 51 so as to govern the work handling apparatus WHA. Accordingly, with the control system thus structured, the work transportation line is adapted suitably for works altered in type without manually changing data or a program stored in the control system S whenever a work type alteration is made. This results in automatization of rearrangement of the production line, and hence an improvement of the automated production line and an increase in production efficiency.

The work transportation line may be modified so as to perform the automatic rearrangement in response to an instruction from any one of succeeding work stations, or a works and pallets storage station, before the work loading station WA. Further, the contour data exchanging section may be replaced with a means for changing a program of sequential operation for a work type after an alteration in the second controller 52.

It is to be understood that although the present invention has been described with respect to an embodiment in which work replacement is made among different types of the same kind of works, nevertheless, it may be made among different types of different kinds of works.

It is further to be understood that although the present invention has been described with regard to a preferred embodiment thereof, various other embodiments and variants may occur to those skilled in the art. Those other embodiments and variants which are within the scope and spirit of the invention are intended to be covered by the following claims.

What is claimed is:

1. A work transportation line control system for controlling a work handling apparatus to hold works on pallets placed, one on top of another, in a stack and load a work transportation line with different types of works in a timed sequence, each of said pallets bearing one type of works thereon, the different types of works having different attributes which are distinguishable from one another, said work transportation line control system comprising:

a camera for forming an image of a pattern of an attribute of a subject work to be handled by said work handling apparatus;

work examination means for examining a position of said subject work and detecting an alteration of work types from one type to another type to provide an instruction indicating a work alteration from one type of works to another type of works whenever a pallet is removed from said stack; and control means for processing said image of said pattern to recognize a specified pattern of said attribute and a position of said subject work and control said work handling apparatus so as to suitably hold said subject work according to said position of said subject work, and comparing said specified pattern of said attribute of said subject work with predetermined reference patterns of said attribute provided for said subject work to change operation of said work handling apparatus according to said work types and adapt said work handling apparatus to suitably hold said subject work whenever said alteration of work types is detected, said predetermined reference patterns of said attribute being replaced in response to said instruction with other predetermined reference patterns of said attribute intrinsic to a type of works designated by said instruction.

2. A work transportation line control system as defined in claim 1, wherein said camera is mounted on said work handling apparatus located immediately before said work transportation line.

3. A work transportation line control system as defined in claim 2, wherein said work handling apparatus includes a work hand adjustable according to different work types whenever a work alteration occurs.

4. A work transportation line control system as defined in claim 1, wherein said control means changes an image processing program of according to said instruction.

5. A work transportation line control system as defined in claim 1, wherein said work alteration instruction means provides said instruction based on control data for a work station preceding said work handling apparatus.

6. A work transportation line control system as defined in claim 1, wherein said work alteration instruction means provides said instruction indicating a work alteration based on control data for a work station following said work handling apparatus.

7. A work transportation line control system as defined in claim 1, wherein said work alteration instruction means enables an operator to manually provide said instruction.

8. A work transportation line control system as defined in claim 1, wherein said work alteration instruction means stores predetermined reference patterns of attributes intrinsic to different work types and makes a comparison of said specified patterns of said attribute of said subject work and said predetermined reference patterns of attributes so as to recognize a work alteration, from one to another, based on a result of said comparison.

9. A method of controlling a work handling apparatus involved in a work transportation line to hold works on pallets placed, one on top of another, in a stack and load a work transportation line with different types of works by said work handling apparatus, each of said pallets bearing one type of a plurality of works thereon, said different types of works having different attributes distinguishable from one another, said method comprising the steps of:

forming an image of a pattern of said attribute of a subject work to be handled by said work handling apparatus;

processing said image of said pattern in a programmed sequence to recognize a specified pattern and a position of said attribute of said subject work;

examining a position of said subject work and detecting an alteration of work types from one type to another type to provide an instruction of a work type alteration from one work type to another work type whenever said pallet is moved away from said stack;

retrieving, in response to said instruction, predetermined reference patterns of said attribute provided for a work type designated by said instruction;

processing said image of said pattern to recognize a specified pattern of said attribute and a position of said subject work and control said work handling apparatus so as to suitably hold said subject work according to said position of said subject work; and comparing said specified pattern of said attribute of said subject work with retrieved predetermined reference patterns to change operation of said work handling apparatus according to said work types and adapt said work handling apparatus to operate suitably for said work type designated by said instruction whenever said alteration of work types is detected.

10. A work transportation line control method as defined in claim 9, wherein said programmed sequence is changed according to said instruction of the work type alteration.

11. A work transportation line control method as defined in claim 9, wherein said instruction is provided based on data from a work station preceding said work handling apparatus.

12. A work transportation line control method as defined in claim 9, wherein said instruction is provided based on data from a work station following said work handling apparatus.

13. A work transportation line control method as defined in claim 9, wherein said instruction is manually provided.

14. A work transportation line control method as defined in claim 9, wherein said specified pattern of said attribute of said subject work is compared with predetermined reference attributes for different work types so as to recognize a work type alteration from one work type to another.

15. A work transportation line control method as defined in claim 9, and further comprising the step of changing a work hand of said work handling apparatus according to different work types whenever a work type alteration occurs.

16. A work transportation line control system as defined in claim 9, and further comprising adjusting a work hand of said work handling apparatus according to different work types whenever a work type alteration occurs.

* * * * *